US012598664B2

(12) United States Patent
Guo et al.

(10) Patent No.: US 12,598,664 B2
(45) Date of Patent: Apr. 7, 2026

(54) PACKET CAPTURE FOR MULTI-LINK DEVICE

(71) Applicant: HEWLETT PACKARD ENTERPRISE DEVELOPMENT LP, Spring, TX (US)

(72) Inventors: Yongchang Guo, Beijing (CN); Xuguang Jia, Beijing (CN); Qiang Zhou, Sunnyvale, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 381 days.

(21) Appl. No.: 18/308,838

(22) Filed: Apr. 28, 2023

(65) Prior Publication Data

US 2024/0365413 A1 Oct. 31, 2024

(51) Int. Cl.
| | |
|---|---|
| *H04W 76/15* | (2018.01) |
| *H04L 43/04* | (2022.01) |
| *H04W 48/16* | (2009.01) |
| *H04W 80/02* | (2009.01) |

(52) U.S. Cl.
CPC ............. *H04W 76/15* (2018.02); *H04L 43/04* (2013.01); *H04W 48/16* (2013.01); *H04W 80/02* (2013.01)

(58) Field of Classification Search
None
See application file for complete search history.

(56) References Cited

U.S. PATENT DOCUMENTS

| | | | |
|---|---|---|---|
| 11,336,487 | B1 | 5/2022 | Dakshinkar et al. |
| 2021/0100050 | A1* | 4/2021 | Ho ......................... H04W 88/08 |
| 2021/0120602 | A1 | 4/2021 | Huang et al. |
| 2021/0212142 | A1 | 7/2021 | Patil et al. |
| 2022/0022033 | A1 | 1/2022 | Ho et al. |
| 2022/0060898 | A1 | 2/2022 | Liu et al. |
| 2022/0116192 | A1 | 4/2022 | Noh et al. |
| 2022/0210696 | A1 | 6/2022 | Cavalcanti et al. |
| 2022/0386109 | A1* | 12/2022 | Mccann .............. H04L 61/5038 |
| 2024/0215086 | A1* | 6/2024 | Guo ....................... H04L 67/303 |
| 2025/0071585 | A1* | 2/2025 | Wakudkar ........... H04L 12/1432 |
| 2025/0280310 | A1* | 9/2025 | Katabathuni ......... H04W 24/08 |

FOREIGN PATENT DOCUMENTS

| | | |
|---|---|---|
| WO | 2021/180541 A1 | 9/2021 |
| WO | 2022/020677 A1 | 1/2022 |
| WO | 2022/076726 A1 | 4/2022 |

* cited by examiner

*Primary Examiner* — German Viana Di Prisco
(74) *Attorney, Agent, or Firm* — Hewlett Packard Enterprise Patent Department

(57) ABSTRACT

Implementations of the present disclosure relate to packet capture for a multi-link device. In the implementations, an access point (AP) obtains a media access control (MAC) address of a multi-link device (MLD) to be monitored. Further, the AP determines a plurality of links of the MLD to be monitored based on the MAC address. Based on the MAC address of the MLD, the AP captures packets transmitted by the AP MLD on the plurality of links, as a monitor AP. For each of the captured packets, the AP inserts the MAC address of the MLD into an MLD MAC field in a packet capture headroom associated with the packet. In this way, the present disclosure can support flexible packet capture (PCAP) for a specific MLD instead of for a specific link.

11 Claims, 10 Drawing Sheets

300A

300B

800

802

OBTAIN AN MAC ADDRESS OF AN MLD

804

DETERMINE A PLURALITY OF LINKS OF THE MLD TO BE MONITORED BASED ON THE MAC ADDRESS

806

CAPTURE PACKETS TRANSMITTED BY THE MLD ON THE PLURALITY OF LINKS BASED ON THE MAC ADDRESS

808

INSERT THE MAC ADDRESS INTO AN MLD MAC FIELD IN A PACKET CAPTURE HEADROOM ASSOCIATED WITH EACH OF THE CAPTURED PACKETS

900

902

RECEIVE A COMMAND TO INSTRUCT A MONITOR AP
TO CAPTURE PACKETS TRANSMITTED BY AN MLD

904

IDENTIFY A PLURALITY OF LINKS OF THE MLD TO BE
MONITORED BASED ON A MAC ADDRESS OF THE MLD

906

SEND, TO A MONITOR AP, AN INDICATION
TO CAPTURE PACKETS TRANSMITTED BY THE MLD
ON THE PLURALITY OF LINKS

1100

NETWORK DEVICE

1110

PROCESSOR(S)

1120

MEMORY

1122

INSTRUCTIONS TO RECEIVE A COMMAND
TO INSTRUCT A MONITOR AP
TO CAPTURE PACKETS TRANSMITTED BY AN MLD

1124

INSTRUCTIONS TO IDENTIFY A PLURALITY OF LINKS
OF THE AP MLD TO BE MONITORED BASED ON
A MAC ADDRESS OF THE MLD

1126

INSTRUCTIONS TO SEND AN INDICATION
TO CAPTURE PACKETS TRANSMITTED BY THE MLD
ON THE PLURALITY OF LINKS

PACKET CAPTURE FOR MULTI-LINK DEVICE

BACKGROUND

Multi-link operation (MLO) is one major MAC feature introduced in Wi-Fi 7. A device that supports MLO may be referred to as a multi-link device (MLD). The MLO enables a non-Access Point (AP) MLD to discover, authenticate, associate, and set up multiple links with an AP MLD. Each link enables channel access and frames exchanges between the non-AP MLD and the AP MLD.

Each MLD has its own MLD Media Access Control (MAC) address for identifying the MLD. In addition, traffics transmitted on a link between a non-AP MLD and an AP MLD will use the MAC address of the virtual AP/Station (STA) supported by the link. In particular, in a Wi-Fi frame comprising packets transmitted by the MLD, a MAC address corresponding to a link of the MLD is present, which is different from the MAC address of the MLD.

BRIEF DESCRIPTION OF THE DRAWINGS

Implementations of the present disclosure may be understood from the following Detailed Description when read with the accompanying figures. In accordance with the standard practice in the industry, various features are not drawn to scale. In fact, the dimensions of the various features may be arbitrarily increased or reduced for clarity of discussion. Some examples of the present disclosure are described with respect to the following figures.

DETAILED DESCRIPTION

An MLD has its own MLD Media Access Control (MAC) address for identifying the MLD. In addition, traffics transmitted on a link between a non-AP MLD and an AP MLD will use the MAC address of the virtual AP/STA supported by the link, which is different from the MAC address of the MLD.

Traditional PCAP mechanisms only support AP PCAP on the radio level. For example, a monitor AP is able to capture packets from itself and/or from its neighbor APs per radio link (e.g., a link of 2.4 GHZ, 5 GHZ, or 6 GHz radio). When coming to the MLD scenario, such a packet is captured with a MAC address specific to a virtual AP/STA supported by a link of an MLD. However, traditional PCAP mechanisms do not support capturing packets per MLD, and it is difficult to analyze the traffic at the MLD level.

Various example implementations of the present disclosure provide a PCAP scheme for an MLD. Specifically, for capturing packets related to an MLD, the radio links to be monitored of the MLD can be identified based on the MAC address of the MLD. As a packet of the MLD is captured by a monitor AP on the identified links, an MLD MAC field can be added to the PCAP headroom associated with the captured packet. The MLD MAC field indicates the MAC address of the MLD.

With these implementations, the present disclosure can support flexible PCAP for a specific MLD, e.g., an AP MLD or an STA MLD. Compared to traditional PCAP mechanisms that only support PCAP on the radio level (also called link level), the implementations of the present disclosure facilitate efficient MLD-level assembly and analysis of the captured packets. In addition, by capturing packets of an MLD only from its working links or a portion of its working links, hardware requirements for PCAP for the MLD can be reduced with the implementations of the present disclosure.

Figure 1:
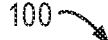
FIG. 1 illustrates an example network environment in which example implementations of the present disclosure may be implemented.
Figure 1:
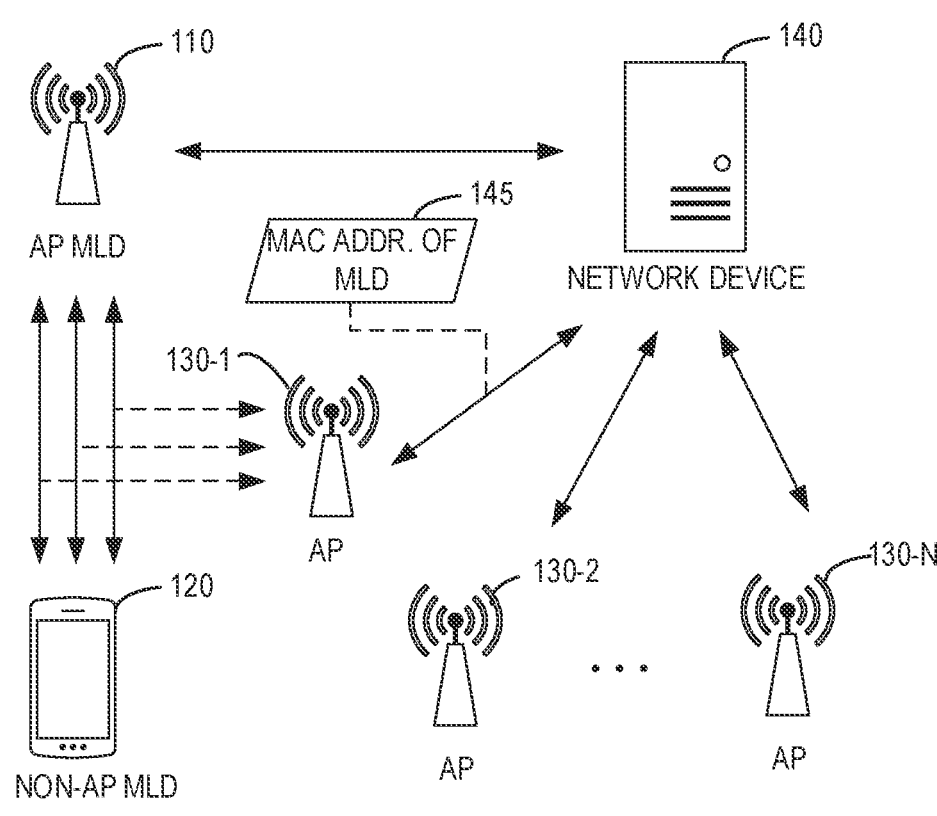

FIG. 1 illustrates an example network environment 100 in which example implementations of the present disclosure may be implemented. As shown in FIG. 1, the environment 100 includes AP MLD 110 and non-AP MLD 120. Multiple links have been set up between AP MLD 110 and non-AP MLD 120. Each link enables channel access and frame exchange between the AP MLD 110 and the non-AP MLD 120. Wi-Fi Frames transmitted on the links encapsulate data of network-layer packets. When performing a PCAP task, an AP can obtain the frames to capture corresponding packets. In the following text, such actions are simply referred to as capturing packets for brevity.

The environment 100 further includes multiple other APs, i.e., an AP 130-1, an AP 130-2, . . . , and an AP 130-N (collectively referred to as the APs 130). The APs 130 may or may not be AP MLD. A network device 140 is configured to manage the AP MLD 110 and other AP 130-1. While most of the examples herein take an AP controller as the example of the network device, the network device herein may also be a controller of another type, a central server, a cloud-based device, or any other type of devices that may perform the actions according to the present disclosure to manage the APs. The AP MLD 110, the non-AP MLD 120, the APs 130, and the network device 140 may function according to the IEEE 802.11 family of wireless communication protocol standards. These standards define the WLAN protocols for the physical (PHY) and MAC layers.

Though a terminal device (not shown), a user may issue a command to the network device 140 to instruct an AP to capture packets related to itself or a neighbor. The device to be monitored can be an MLD. According to the command, the network device 140 may send an indication to the AP for capturing packets of the corresponding device, as indicated by the command.

As illustrated in FIG. 1, the command may instruct the AP 130-1 to capture packets transmitted by the AP MLD 110. Once receiving the user command, the network device 140 may check if the AP 130-1 has the capability to perform the MLD PCAP task. If not, the network device 140 may quit the PACP process and may show error information to the user, e.g., via the user interface of the terminal device.

When the AP 130-1 has the capability, the network device 140 may further identify a plurality of links of AP MLD 110 to be monitored. In some example implementations, the network device 140 may identify the plurality of links by checking a radio list of the AP MLD 110. This radio list includes the information of working channels (i.e., the channels being used to exchange the Wi-Fi frames encapsulating packets) of the AP MLD 110.

For identifying the working channels of an MLD, the APs under the control of the network device 140 may perform scans on available frequency bands (e.g., the 2.4 GHz band, the 5 GHz band, etc.) for packets transmitted by MLDs. An AP may perform such scans regularly according to its configuration. Through the scan, the AP may identify packets of its neighbor devices on various radio channels, which indicates that respective devices are working on these channels.

The MAC address corresponding to an MLD link can be seen from a captured packet. Then, the MAC address of an MLD (and thus the MLD) can be derived from the MAC address of a captured packet. For example, the AP 130-1 can identify distinct MAC addresses of the captured packets, and identify that on which channels the packets with each of these MAC addresses were captured. As another example, AP 130-1 can identify each distinct MAC address of an MLD, as well as identify the corresponding channels. The network device 140 may receive information about the working channels of an MLD from one or more APs. Then, the network device 140 may process and aggregate the information accordingly, to obtain a radio list of the MLD for later use.

An AP may also perform such a scan upon receiving a scan instruction from the network device 140. For example, the network device 140 may find that it does not have the radio list of an MLD when needed, or that the radio list is out-of-date (e.g., was not updated longer than a threshold period). Then, the network device 140 may be triggered to control one or more APs to scan available channels for working channels of this MLD.

After the plurality of links of AP MLD 110 are identified for the command, the network device 140 may send an indication for performing PACP to the AP 130-1. The indication includes the MAC address 145 of the MLD to be monitored (AP MLD 110 in this example). The instruction may also include information on the plurality of links (e.g., band and channel of respective links). Upon receiving the instruction with the MAC address of the AP MLD 110, the AP 130-1 may determine the plurality of links from the indication. With the links to monitor and the MAC address, the AP 130-1 may capture packets transmitted by the AP MLD 110 on these links and perform post-processing on the captured packets.

In some cases, the network device 140 may determine one or more further APs to assist AP 130-1 for a PCAP task, as will be described later in connection with FIG. 4 and FIG. 5. Further, it is to be understood that, while most of the examples herein are described in the context of capturing packets of an AP MLD, implementations of the present disclosure can also be used to capture packets of a non-AP MLD, such as the non-AP MLD 120. Also, following the principle introduced in the present disclosure, implementations of the present disclosure can be adapted to capture packets sent by a specific MLD, packets sent to a specific MLD, or both, according to the intended purpose of specific PCAP tasks.

Figure 2:
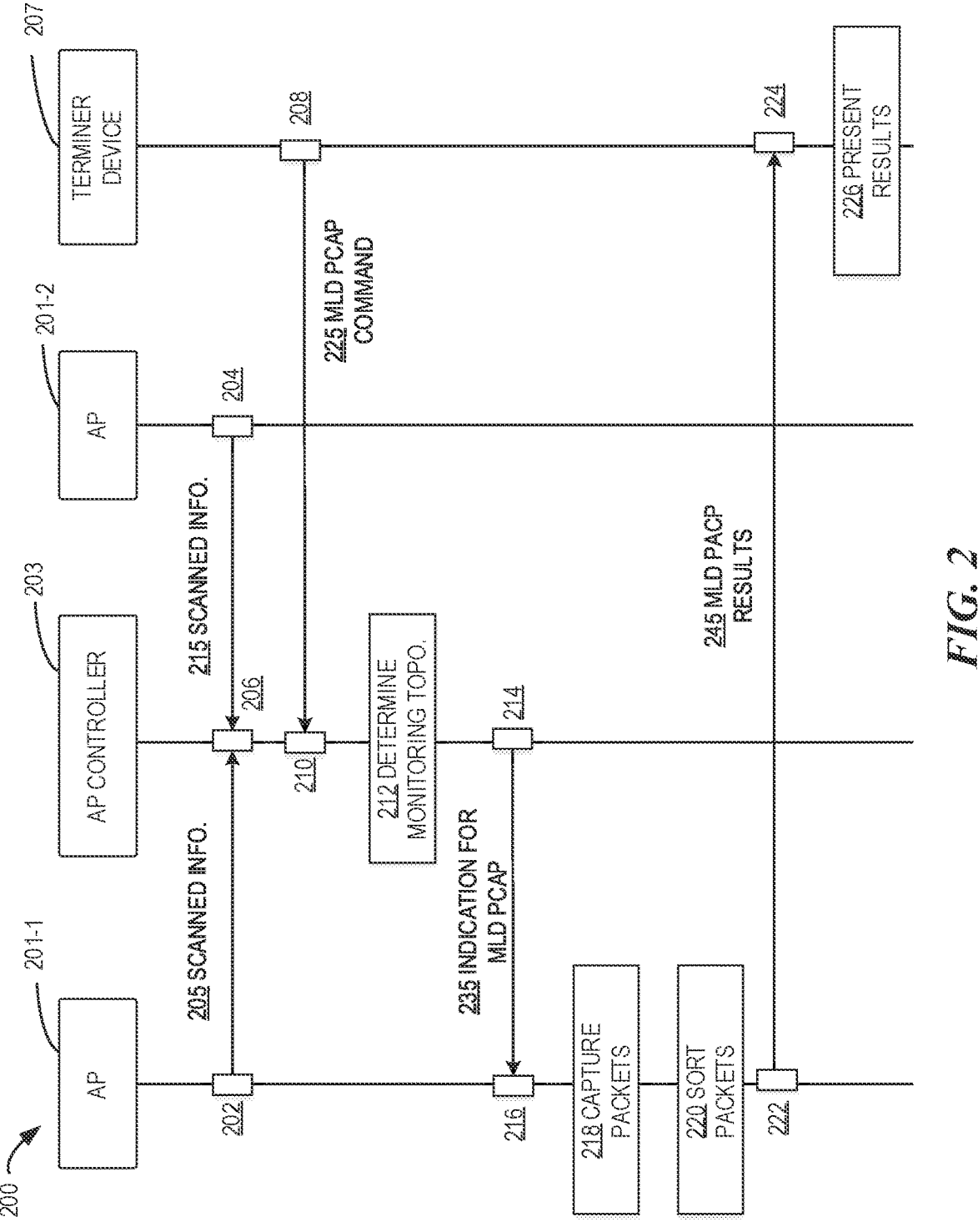
FIG. 2 illustrates an example signaling diagram for an example process of MLD-level packet capture (PCAP) in accordance with some example implementations of the present disclosure.

FIG. 2 illustrates an example signaling diagram 200 for an example process of MLD-level PCAP in accordance with some example implementations of the present disclosure. In this example, an AP 201-1 plays the role of a monitor AP to capture packets transmitted by a specific MLD.

As illustrated in FIGS. 2, at 202 and 204, the AP 201-1 and an AP 201-2 managed by an AP controller 203 (which plays the role of a network device such as the network device 140) may send scanned information about working channels of MLDs around them, i.e., the scanned information 205 and the scanned information 215. At 206, the AP controller 203 may receive the scanned information from the AP 201-1, the AP 201-2, and possibly other APs not shown. Depending on specific implementations, the AP controller 203 may receive scanned information from different APs at different time points, and one AP may send such information multiple times to the AP controller 203 upon each scan.

The AP controller 203 may process the received information from the APs to determine the working channels of MLDs. Accordingly, the AP controller 203 may store or update the information of a particular MLD, for example, in a radio list associated with this MLD (e.g., identified by its MAC address and/or other unique identifiers). The radio list indicates the working channels of the particular MLD. For example, the working channels can be represented by radio numbers of the MLD (e.g., radio 1), band identifier (e.g., channels of the 5 GHz band), channel number(s) of a band (e.g., channel 11 of the 2.4 GHz band), or the like, depending on the detail level of control.

At 208, a terminal device 207 may send an MLD PACP command 225 to the AP controller 203. For example, the terminal device 207 may receive a user command through a control console of a packet analysis tool installed on it. This command is used to instruct the AP 201-1 to capture packets transmitted by a particular MLD (referred to as the monitored MLD in the following text). The command may include a parameter specifying the AP 201-1 as the monitor AP, as well as a parameter indicating the MAC address of the monitored MLD.

At 210, the AP controller 203 may receive the command. Suppose that in this example, the AP 201-1 has the capability for MLD PCAP. Otherwise, the AP controller 203 may quit the PCAP process and may return error information to the terminal device 207 for notice.

At 212, according to the received command, the AP controller 203 may determine a monitoring topology for one or more APs to capture packets transmitted by the monitored MLD. The topology includes information about one or more monitor APs including AP 201-1, and information about one or more links assigned to each of the monitor APs. Each monitor AP is supposed to capture packets of the monitored MLD on the link(s) assigned to it.

For determining the monitoring topology, the AP controller 203 may identify a set of links of the monitored MLD based on its MAC address. The packets of the monitored MLD should be captured by the monitor AP(s) on the identified link(s). In some example implementations, the AP controller 203 may retrieve the corresponding radio list of the monitored MLD according to its MAC address. The radio list may include information about the working channels of the monitored MLD as described above.

Based on the information in the radio list, AP controller 203 may identify the characteristics (such as the band and/or channel range) of the working link(s) of the monitored MLD. Depending on the desired detail level of control, the AP controller 203 may identify the monitored MLD is transmitting on a link using a certain band (e.g., the 5 GHz band), or the AP controller 203 may identify the monitored MLD is transmitting on a link using a certain channel of a band (e.g., channel 11 of the 2.4 GHz band), or the like.

If the AP controller 203 does not have the radio list, or the information in the radio list is unusable, the AP controller 203 may be triggered to control one or more neighbor APs of the monitored MLD to perform a scan. For example, the AP controller 203 may send a scan instruction to one or more neighbor APs with the MAC address of the monitored MLD. Upon receiving the scan command, each of the one or more neighbor APs may perform a scan on available channels for packets transmitted by the monitored MLD.

For example, if such packets are found on a channel of the 5 GHz band, it may be determined that the MLD is working on this channel. In an example implementation, a neighbor AP can search for packets with MAC addresses that are partially identical to the MAC address of the monitored MLD (e.g., for the first several bits). AP controller 203 can receive the scan results and aggregate the results to obtain the radio list of the monitored MLD.

In some example implementations, upon checking the radio list corresponding to the monitored MLD, the AP controller 203 may take the working links of the monitored MLD as the set of links to be monitored. In some examples implementations, the received MLD PACP command may further include parameters specifying a predetermined set of radio bands. In this case, the AP controller 203 may determine the plurality of links by intersecting the radio range of working links of the monitored MLD and the predetermined set.

For example, a user may be interested in capturing packets on the 2.4 GHz and the 5 GHz bands. Thus, the set of the 2.4 GHz band and the 5 GHz band may be specified in the command. In an example implementation, the parameter(s) may represent the band(s) by radio number(s) of the monitored MLD, such as 0, 1, or 2. Other implementations, such as specifying the frequency range, are also within the scope of the present disclosure.

In this case, when the AP controller 203 has identified the working links, it may further exclude the links that are not of interest to the particular command. For example, when the bands of interest are the 2.4 GHz and the 5 GHz bands, and the identified working links are using the 2.4 GHZ, 5 GHz band, and the 6 GHz band, the AP controller 203 may identify the link to be monitored are the ones using 2.4 GHz band and the 5 GHz band. Depending on the desired level of control, the AP controller 203 may also identify the link as using a particular channel of the 5 GHz band. In addition, the AP controller may also identify the links to be monitored with further characteristics, such as bandwidth, number of spatial streams (NSS), etc.

Further, the AP controller 203 may determine if the AP 201-1 has enough radio resources to capture packets on all the identified links. In some example implementations, the monitor AP and the monitored MLD are determined to be the same device, such as by comparing if they have the same MAC address. In this case, the AP controller 203 may determine that the AP 201-1 has enough radio resources to perform this PACP task on its own. If the monitor AP and the monitored MLD are different devices, the AP controller 203 may further check the current working mode of the AP 201-1.

Upon checking, if the AP 201-1 is working in the AP mode, it is providing some service to other devices. To ensure the service works well, the working channels of the AP 201-1 cannot be randomly changed. In this case, the AP controller 203 may compare the radio resources of the working channels of the AP 201-1 with the links to be monitored. When the working channels of the AP 201-1 have enough radio resources to cover the links, the AP controller 203 may determine that the AP 201-1 can perform the MLD PACP task on its own, as specified by the MLD PACP command 225.

If the AP 201-1 is working in the air monitor (AM) mode, then its working channels can be tuned to better perform a monitoring task. In this case, the AP controller may first compare the radio resources of the working channels of AP 201-1 to the links to be monitored. When the working channels of the AP 201-1 have enough radio resources to cover the links for capturing packets, the AP controller 203 may determine that the AP 201-1 can perform the MLD PACP task on its own.

In the AM mode case, if the working channels of the AP 201-1 do not have enough resources, the AP controller 203 may further check all available radio resources of AP 201-1. When the available radio resources may cover the links for capturing packets, the AP controller may determine that, upon some adjustments of its working channels, the AP 201-1 may perform the MLD PACP task on its own.

Figure 3A:
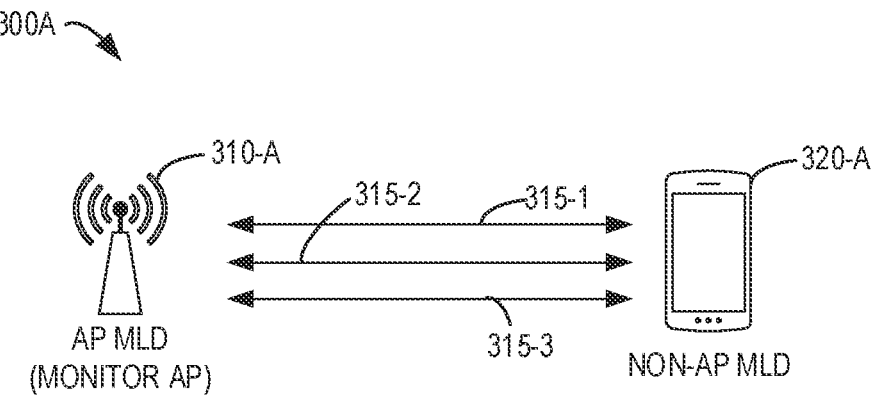
FIGS. 3A and 3B illustrate schematic diagrams of example topologies determined for a monitor AP to capture packets transmitted by an MLD, in accordance with some example implementations of the present disclosure.
Figure 3B:
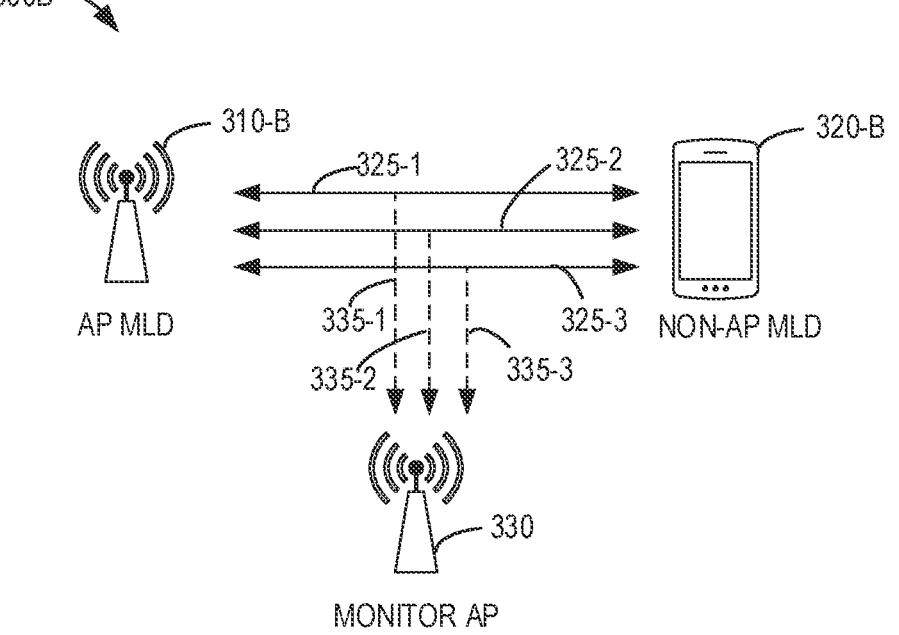

In the example, AP 201-1 is able to perform the task on its own. Then, the AP controller 203 may determine a topology for the AP 201-1 to capture packets of the monitored MLD. Reference is made now to FIGS. 3A and 3B, which illustrate schematic diagrams of example topologies determined for a monitor AP to capture packets transmitted by an MLD, in accordance with some example implementations of the present disclosure.

In the example 300A illustrated in FIG. 3A, an AP MLD 310-A is connecting with a non-AP MLD 320-1 through radio links 315-1, 315-2, and 315-3. At some point, a network device (e.g., AP controller 203) may receive an MLD PACP command which specifies the AP MLD 310-A as the monitor AP.

The MLD PACP command also indicates the MAC address of the MLD to be monitored. Based on the MAC address, the network device has determined that the MLD to be monitored is also the AP MLD 310-A. For illustration, suppose that in this example, the network device has also identified that all of the links 315-1, 315-2, and 315-3 need to be monitored. Thus, the network device may determine a topology as FIG. 3A illustrates. According to this topology, as the monitor AP, the AP MLD 310-A will be instructed to capture packets transmitted by itself on the links 315-1, 315-2, and 315-3.

In the example 300B illustrated in FIG. 3B, an AP MLD 310-B is connecting with a non-AP MLD 320-B through radio links 325-1, 325-2, and 325-3. At some point, a network device (e.g., AP controller 203) may receive an MLD PACP command for capturing packets transmitted by the AP MLD 310-B, indicated by the MAC address of the AP MLD 310-B.

The MLD PACP command also specifies another AP, the monitor AP 330, to perform this PCAP task. In this example, suppose that the network device has identified that all of the links 325-1, 325-2, and 325-3 need to be monitored, and the monitor AP 330 has enough radio resources to perform the PCAP task on its own, with or without tuning its working channels. Thus, the network device may determine a topology as FIG. 3B illustrates. According to this topology, the monitor AP 330 will be instructed to capture packets of the AP MLD 310-B on links 325-1, 325-2, and 325-3 using corresponding radio resources, as illustrated by 335-1, 335-2, and 335-3.

Refer back to FIG. 2, according to the MLD PACP command 225 and the determined monitoring topology, the AP controller 203 may send, at 214, an indication 235 for MLD PCAP to the AP 201-1. The indication 235 is used to instruct AP 201-1 to capture packets transmitted by the monitored MLD. It includes at least the information regarding the MAC address of the monitored MLD and the links to be monitored as identified. When there is a need to tune the working channels of the AP 201-1, the AP controller 203 may also send an indication to the AP 201-1 for tuning the working channels of the AP 201-1 to the frequency channels corresponding to the plurality of links.

At 216, the AP 201-1 may receive the indication 235. Upon the reception, the AP 201-1 may start capturing packets transmitted by the monitored MLD on the links according to the indication, as illustrated by 218. The AP 201-1 may obtain the MAC address of the monitored MLD from the indication 235. The AP 201-1 may also determine the links of the monitored MLD from this indication that including the corresponding MLD MAC address. The AP 201-1 will first tune its work channels to match the links to monitor if receiving a respective indication. For example, the AP 201-1 may adjust its working channels to channels of the same band as used by the links.

On the monitored links, the AP 201-1 may also capture packets of other devices. Based on the MAC address of the monitored MLD, the AP 210 may determine captured packets of the monitored MLD from all captured packets. For example, a captured packet may have a MAC address corresponding to a link of a certain MLD. The MAC address in the captured packet corresponding to a link is partially identical to the MAC address of the prior-mentioned certain MLD (e.g., for the first several bits), or the two MAC addresses may have some mapping relationships otherwise. Thus, the AP 201-1 may identify a captured packet of the monitored MLD, by comparing the MAC address seen from the captured packet and the MAC address of the monitored MLD.

The AP 201-1 may add a packet capture headroom for each captured packet. The headroom may include various types of information regarding the captured packets, such as physical information about the packet and the PCAP process. When a packet transmitted by the monitored MLD is captured, the AP 201-1 may insert the MAC address of the monitored MLD into an MLD MAC field in the PCAP headroom associated with this packet. Thus, an analysis tool later may easily utilize the MLD MAC field to perform MLD-level packet analysis.

In some example implementations, the AP 201-1 may further insert the MAC address of an MLD on the other side of the link into the headroom. As a result, e.g., for a packet captured on a link between an AP MLD and an STA MLD, both the MAC address of the AP MLD and the address of the STA MLD may be identified and inserted into the headroom of the captured packet. This provides richer information for the captured packets on the MLD level and facilitates more flexible analysis from different perspectives. Following the same principle as described above, the MLD MAC address to be inserted may be adapted to the purpose of specific PCAP tasks, indicated by the PCAP command, and/or may vary among implementations, etc.

In some example implementations, AP 201-1 may also determine a timing synchronization function (TSF) timestamp for each of the captured packets. The TSF timestamp is counted relative to a uniform timeline associated with the monitored MLD. For a particular link, time synchronization is accomplished by synchronizing the reference time indicated by beacon frames sent on the link. Thus, for determining the timestamp relative to the uniform timeline at the MLD level, AP 201-1 may get the time offsets among the links and may perform a link TSF alignment. AP 201-1 may also insert the determined TSF timestamp into the PCAP headroom.

At 220, AP 201-1 may sort the packets it captured from the monitored MLD, based on MLD MAC fields, traffic identifiers (IDs), sequence numbers, and TSF timestamps of the captured packets. At 222, the AP 201-1 may send the sorted packets, i.e., the MLD PACP results 245, to the terminal device 207 as the destination device. The address of the destination device may be included in the indication 235 in some example implementations. As an example, the AP 201-1 may only need to keep and send the packets of the monitored MLD to the terminal device 207, which may reduce the transmission cost. During the PCAP process, the actions of 218-222 may happen multiple times.

At 224, the terminal device 207 may receive the MLD PCAP results 245 from the AP 201-1. Then, the terminal device 207 may present the results at 226 e.g., on a user interface of an analysis tool installed on the terminal device 207. For example, according to a command, the terminal device may list captured packets of the monitored MLD, identified by the MLD MAC address in the PCAP headroom. As another example, the terminal device may obtain various statistics of the packets according to the information inserted in the PACP headroom.

By capturing packets of a particular MLD with various types of information, analysis regarding the traffics of the particular MLD can be more easily performed, which facilitates better control and debugging of MLDs. In some examples implementations, the terminal device may visualize the captured packets of the monitored MLD on aligned timelines corresponding to the monitored links or on a uniform timeline, as will be described in connection with FIG. 6.

In some cases, a network device may determine one or more further monitor APs in addition to the one specified by the MLD PCAP command. For this case, FIG. 4 illustrates another example signaling diagram 400 for an example process of MLD-level PCAP in accordance with some example implementations of the present disclosure.

In this process, an AP 401-1 and an AP 401-2 cooperatively capture packets transmitted by a specific MLD (referred to as the monitored MLD below). The AP 401-1 and AP 401-2 are under the management of an AP controller 403 (which plays the role of a network device as, e.g., the network device 140). Similar to the AP controller 203 of FIG. 2, the AP controller 403 may receive and aggregate scanned information from APs to obtain radio lists corresponding to various MLDs, which can be used to control MLD-level PACP.

At 402, a terminal device 407 may send an MLD PCAP command 405 to the AP controller 403. The MLD PCAP command 405 is used for instructing the AP 401-1 to capture the packets of a monitored MLD. At 404, the AP controller 403 may receive this command.

At 406, according to the received command, the AP controller 403 may determine a monitoring topology for capturing packets of the monitored MLD. The AP controller 403 may determine the topology by comparing the characteristics of links to be monitored with capabilities of the AP 401-1, similar as described in connection with 212 of FIG. 2. In this example, the AP controller 403 determines that AP 401-1 does not have enough radio recourse for performing the PCAP task as indicated by the MLD PCAP command 405.

For example, the AP controller 403 may determine that the monitored MLD is a different device than the AP 401-1. On this basis, the AP controller 403 may further determine that the AP 401-1 is working in the AP mode, and its working channels do not have enough radio resources to cover the links to be monitored. Alternatively, the AP controller 403 may further determine that the AP 401-1 is working in the AM mode, and its available radio resources are not enough to cover the links to be monitored. In the above two cases, the AP controller 403 may determine one or more further APs to perform the MLD PCAP task in cooperation with the AP 401-1.

For example, the AP controller 403 may determine that AP 401-1 cannot capture packets on a portion of the links to be monitored. Thus, the AP controller 403 may determine one or more other APs in proximity to the monitored MLD and together have the capabilities to capture packets on the portion of links.

In this example, the AP 401-2 is determined to be the further monitor AP. Then, the AP controller 203 may determine a topology for AP 401-1 and AP 401-2 to capture packets of the monitored MLD. A schematic diagram 500 for an example topology determined for multiple monitor APs to capture packets transmitted by an MLD is illustrated in FIG. 5, in accordance with some example implementations of the present disclosure.

In the example 500, an AP MLD 510 is connecting with a non-AP MLD 520 through radio links 525-1, 525-2, and 525-3. At some point, a network device (e.g., AP controller 403) may receive an MLD PACP command. This command is sent to instruct an AP, i.e., the monitor AP 531 in this example, to capture packets transmitted by the AP MLD 510. For illustration, suppose that in this example, the network device has identified that all of the links 525-1, 525-2, and 525-3 need to be monitored according to the command.

The network device may further identify that the monitor AP 531 can capture the packets on the links 525-1 and 525-2. Thus, the network device may need to determine a further AP to capture packets on the link 525-3, so as to accomplish the PACP as required by the command. As a result, the network device can determine a monitoring topology as illustrated in FIG. 5. According to this topology, the monitor AP 531, as the main AP specified by the MLD PCAP command, will be instructed to capture packets transmitted by the AP MLD 510 on the links 525-1 and 525-2, as illustrated by 535-1 and 535-2. In addition, a monitor AP 532 will be instructed to capture packets of the AP MLD 501 on the link 525-3, as illustrated by 535-3.

Refer back to FIG. 4. At 406, the AP controller 403 may send an indication 415-1 and an indication 415-2 for PCAP to the AP 401-1 and the AP 401-2, respectively. The indications instruct the respective APs to capture packets transmitted by the monitored MLD on at least one of the links to monitor, as determined in the monitoring topology. In some cases, the AP controller 403 may determine that AP 401-1 and/or AP 401-2 need to tune the working channels for this PCAP task. Then, the AP controller 403 may also send an indication to instruct a respective AP to adjust its working channels to match the links it needs to monitor.

At 408, the AP 401-1 may receive the indication 415-1. According to the indication, the AP 401-1 may start to capture packets of the monitored MLD at 412. In this example, the AP 401-1 may capture packets on some of the links to monitor within its capability, maybe after tuning its working channels when necessary and possible. The 401-1 may perform the PCAP task in a similar way as described in connection with 218 of FIG. 2. For a captured packet of the monitored MLD, AP 401-1 may add a PCAP headroom for the captured packet. Similarly, the PACP headroom includes fields for the MAC address of the monitored MLD and a TSF timestamp relative to a uniform timeline associated with the monitored MLD. Also, the AP 401-1 may further insert the MAC address of an MLD on the other side of the link into the headroom in some example implementations.

At 410, the AP 401-2 may receive the indication 415-2. The indication 415-2 is used to instruct the AP 401-2 to capture packets transmitted by the MLD at least on the link(s) to be monitored and cannot be monitored by the AP 401-1. According to the indication, the AP 401-1 may start to capture packets of the monitored MLD on the corresponding link(s) at 414. Similar to the AP 401-1, the AP 401-2 may add a PCAP headroom for each captured packet.

As the supplementary monitor AP, the AP 401-2 may send the captured packets of the monitored MLD to the AP 401-1 at 416. For example, the indication 415-2 may instruct AP 401-2 to forward the captured packets to the AP 401-1 as the destination device. These packets will be further sent by the AP 401-1 to the destination device for this PACP task. At 418, the AP 401-1 may receive the packets of the monitored MLD captured by the AP 401-2.

In the cases when more than more supplementary APs are determined for an MLD PCAP task, each supplementary AP may act similarly to the AP 401-2. According to the indication for PCAP it has received, each supplementary AP may capture packets of monitored MLD on respective links, as well as send the captured packets to the main monitor.

At 420, as the main monitor AP, AP 401-1 may sort the packets of the monitored MLD captured by all monitor APs. The AP 401-1 may sort the packets based on MLD MAC fields, TIDs, sequence numbers, and TSF timestamps of the captured packets. At 422, the AP 401-1 may send the sorted packets, i.e., the MLD PACP results 435, to the terminal device 407 as the destination device. The AP 401-1 may perform these actions similarly as described in connection with 203 and 222 of FIG. 2. Further, during the PCAP process, the actions of 412-422 may happen multiple times and may not always be in the exact order as in FIG. 4.

In some example implementations, the sorting of captured MLD may also be performed by the network device, e.g., the AP controller 203 or the AP controller 403. In this case, when sending an indication for an MLD PCAP task to a main monitor AP and possibly to one or more further monitor APs, the network device may instruct each of the monitor APs to send its captured packets to the network device.

According to the indication, each monitor AP may capture packets of the monitored MLD on respective link(s). Upon capturing a packet of the MLD, the monitor AP may add an MLD PCAP headroom for the packet, indicating the MAC address and the TSF timestamp following a unified time reference. Further, the monitor AP may send its captured packets for this PCAP task to the network device as the destination device.

Upon receiving captured packets of the MLD from the monitor AP(s), the network device may sort the captured packets, in a way similar to how a main monitor AP may perform the packet sorting as described above. Then, the network device may send the sorted packets to the final destination device, such as a terminal device that sends the MLD PACP command.

Figure 4:
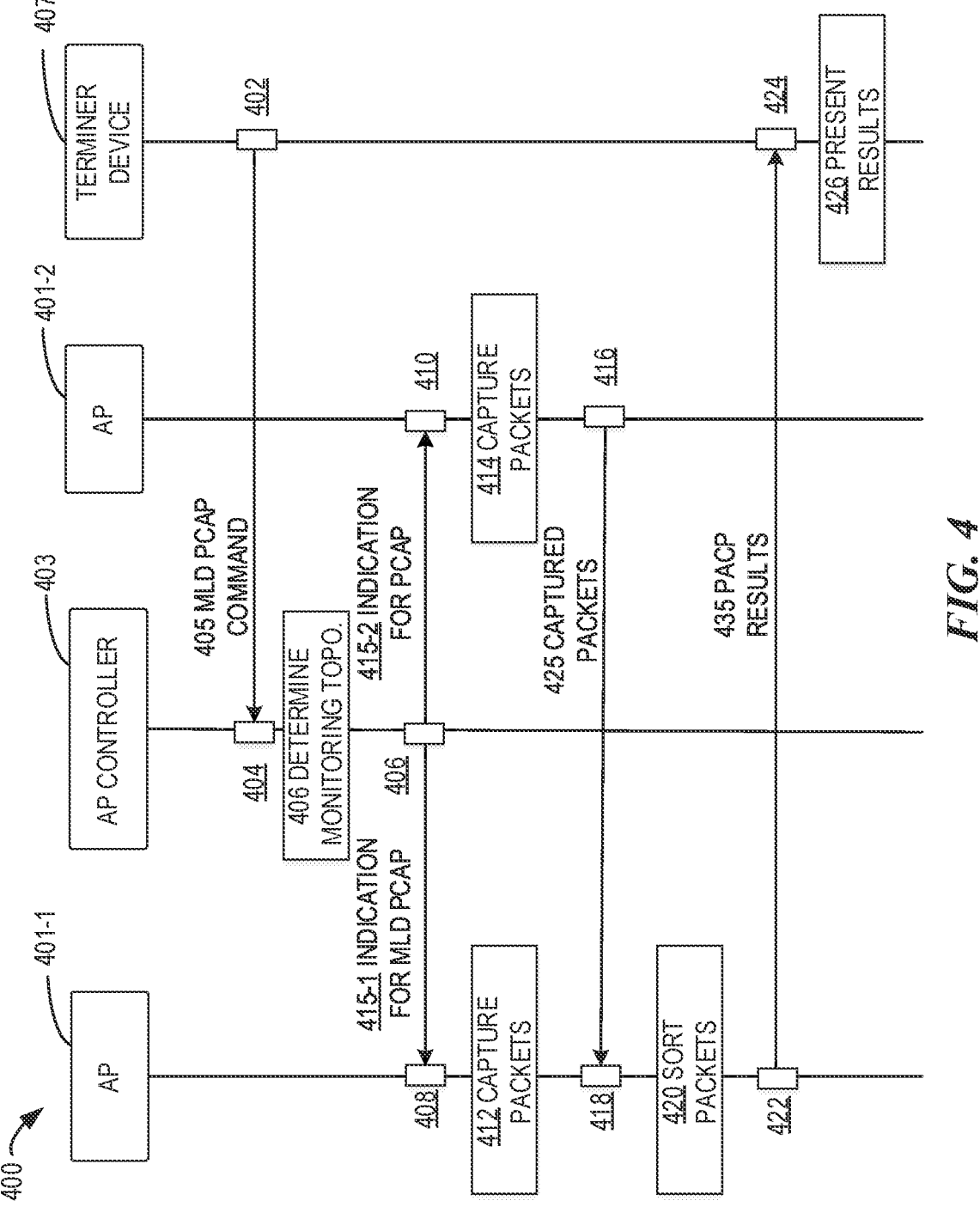
FIG. 4 illustrates another example signaling diagram for an example process of MLD-level PCAP in accordance with some example implementations of the present disclosure.
Figure 5:
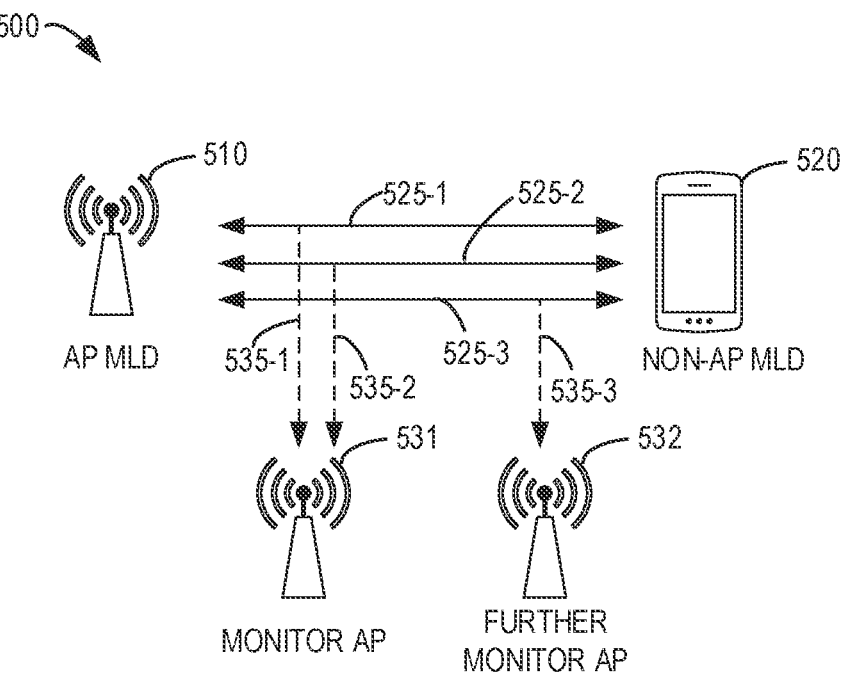
FIG. 5 illustrates a schematic diagram for an example topology determined for multiple monitor APs to cooperatively capture packets transmitted by an MLD, in accordance with some example implementations of the present disclosure.

Continue to refer to the FIG. 4. At 424, the terminal device 407 may receive the sorted packets, i.e., PACP results 435. Then, similar to the action at 224 of FIG. 2, the terminal device 207 may present the results at 426, e.g., on a user interface of an analysis tool installed on the terminal device 207.

With the network device controlling further monitor APs to assist the main monitor AP specified by the MLD PCAP command, the users do not need to care about the exact arrangement by which the packets of an MLD are captured. The network device can determine the monitoring topology to ensure an MLD PCAP command is fulfilled, even when the designated monitor AP does not have the capability to capture packets on all the links as required by the command. On the other side, the network device can control the APs to capture packets only on the links as necessary for fulfilling the command, thereby saving the hardware resources.

Figure 6:
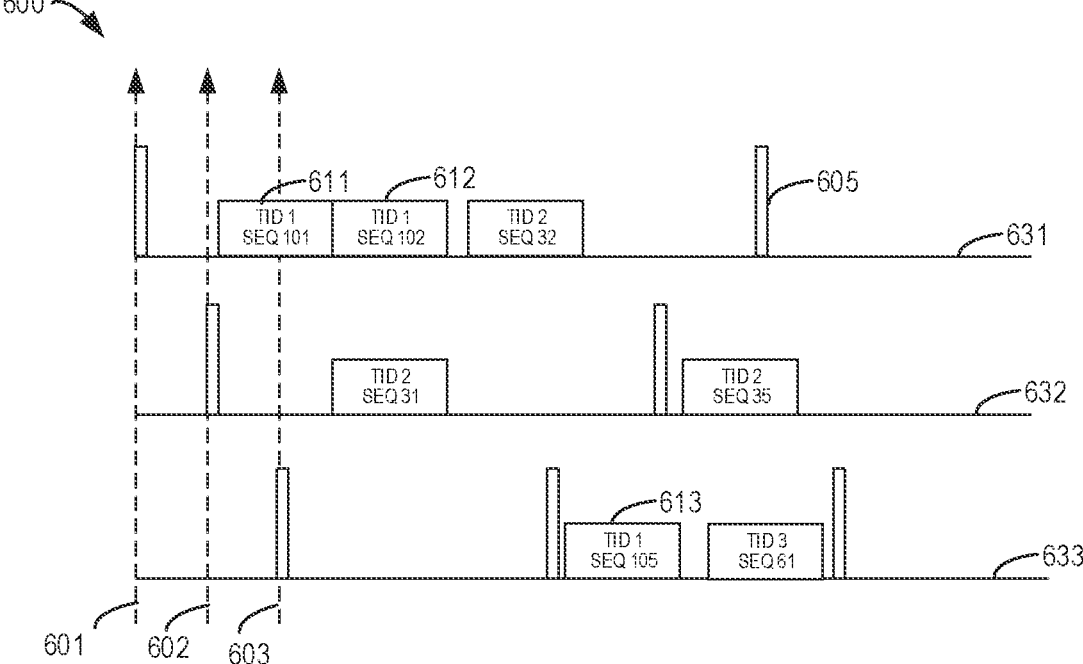
FIG. 6 illustrates an example visualization of captured packets on different links of a monitored MLD in accordance with some example implementations of the present disclosure.

FIG. 6 illustrates example visualization 600 of captured packets transmitted by an MLD on different links, in accordance with some example implementations of the present disclosure. For example, the visualization 600 may be presented on the terminal device 207 of FIG. 2 or the terminal device 407 of FIG. 4.

With the MAC address of the monitored MLD in the PCAP headroom, the terminal device may filter packets of this specific MLD for visualization. In this example, packets of an MLD are captured on three links, each with AP reporting beacons regularly, as visualized, e.g., by 605. The captured packets are presented on timelines corresponding to respective links, as shown by 631, 632, and 633, respectively.

The three timelines, 631, 632, and 633, have been aligned according to the time offsets among the links, as shown by the reference axes 601, 602, and 603. For example, the timeline 631 may be treated as the primary timeline, and the axes of the other two timelines are placed in relation to the axis 601 of the timeline 631. With the TSF timestamps relative to a uniform timeline (e.g., relative to the primary timeline) in the PCAP headroom, the temporal order of captured packets may be correctly presented on these timelines (from left to right in this example). For example, the packets of one traffic flow will be presented in the order matching their sequence (SEQ) number without overlap (e.g., as shown by packets 611, 612, and 613), while such overlaps may happen without the timestamps using a unified time reference.

After receiving sorted packets from a monitor AP or a network device, the terminal device may visualize the captured packets in various ways other than the one shown in FIG. 6. For example, the terminal device may present all packets of an MLD on a uniform timeline instead of multiple aligned timelines. As another example, the terminal device 207 may present packets of an MLD for specific traffic, filtered by the respective TID. The flexible presentations can facilitate user investigation of the traffics related to an MLD from multiple perspectives.

The above examples mainly describe the MLD PCAP at the lower MAC (LMAC) level, in which the captured packets of an MLD still contain respective link information as it is transmitted. In some cases, the monitor AP and the monitored MLD are the same device, e.g., as FIG. 3A shows. In this case, the monitor AP has the ability to modify and convert the frames corresponding to the captured packets. Thus, in some example implementations, the monitor AP may further process the MLD PCAP results when it performs self-packet captures, which enables upper MAC (UMAC) level MLD PCAP.

Figure 7:
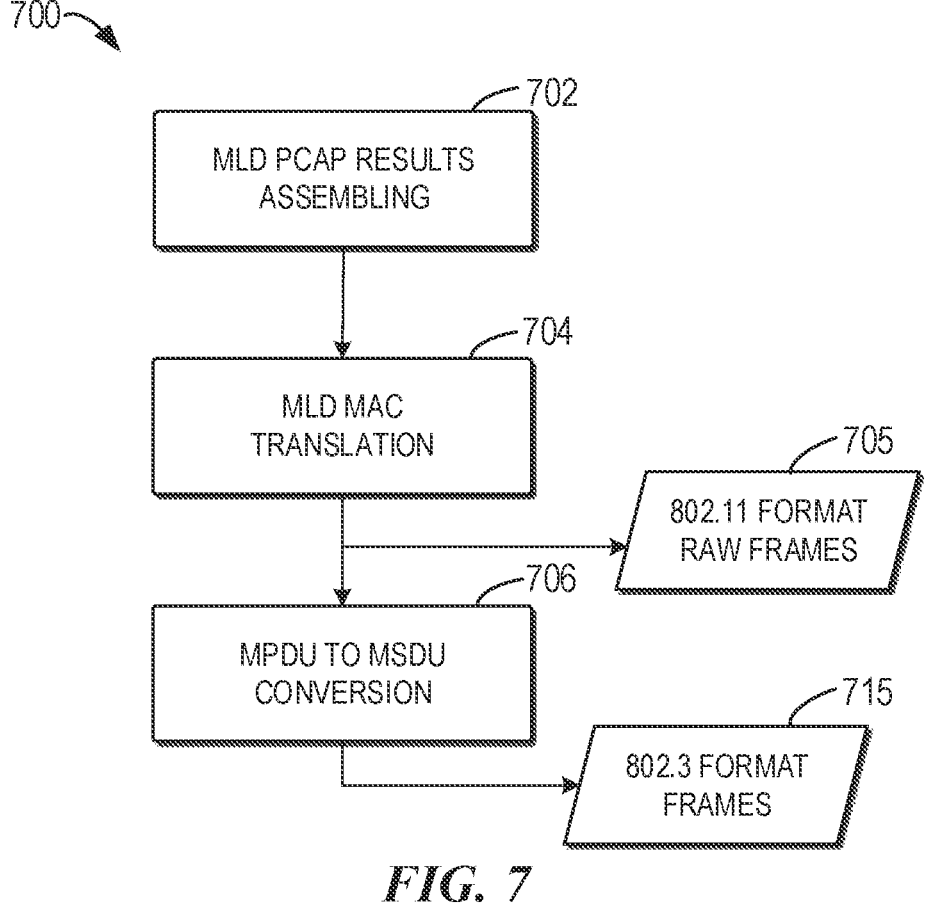
FIG. 7 illustrates an example process that can be applied to the captured packets when a monitor AP captures packets transmitted by itself, in accordance with some example implementations of the present disclosure.

FIG. 7 illustrates an example process 700 that may be applied to the captured packets when a monitor AP captures packets transmitted by itself, in accordance with some example implementations of the present disclosure. For example, the process 700 may be performed by the AP MLD 310-A of FIG. 3A on the captured packets transmitted by itself.

At 702, the monitor AP may assemble PCAP results for a self-packet capture task. For example, the AP MLD 310-A of FIG. 3A may assemble the captured packets, such as by unifying the temporal reference of their TSF timestamps and sorting the packets as described above.

At 704, the monitor AP may perform MLD MAC translation on the PCAP results. For example, the AP MLD 310-A may convert the MAC address (which corresponds to a respective link) of each of the captured packets to the MAC address of the monitored MLD, i.e., the MAC address of the AP MLD 310-A. The AP MLD 310-A may further eliminate other link-specific information of the captured packets, such as link-specific temporal information. In this way, the IEEE 802.11 format raw frames 715 corresponding to the captured packets can be provided for further debugging, which is specific to the AP MLD 310-A in this example.

At 706, the monitor AP may perform an MPDU (MAC Protocol Data Unit) to MSDU (MAC Service Data Unit) translation on the 802.11 format raw frames 705. Through this translation, the IEEE 802.11 format Wi-Fi frames may be converted to the IEEE 802.3 format Ethernet frames. As a result, the 802.3 format frames corresponding to the captured packets can be provided for further debugging.

With the actions in the process 700, more options for obtaining PCAP results at different layers of the network communication can be provided. It enables more flexible analysis for the MLD communication states, thereby enhancing the capability of packet capture and analysis tools.

Figure 8:
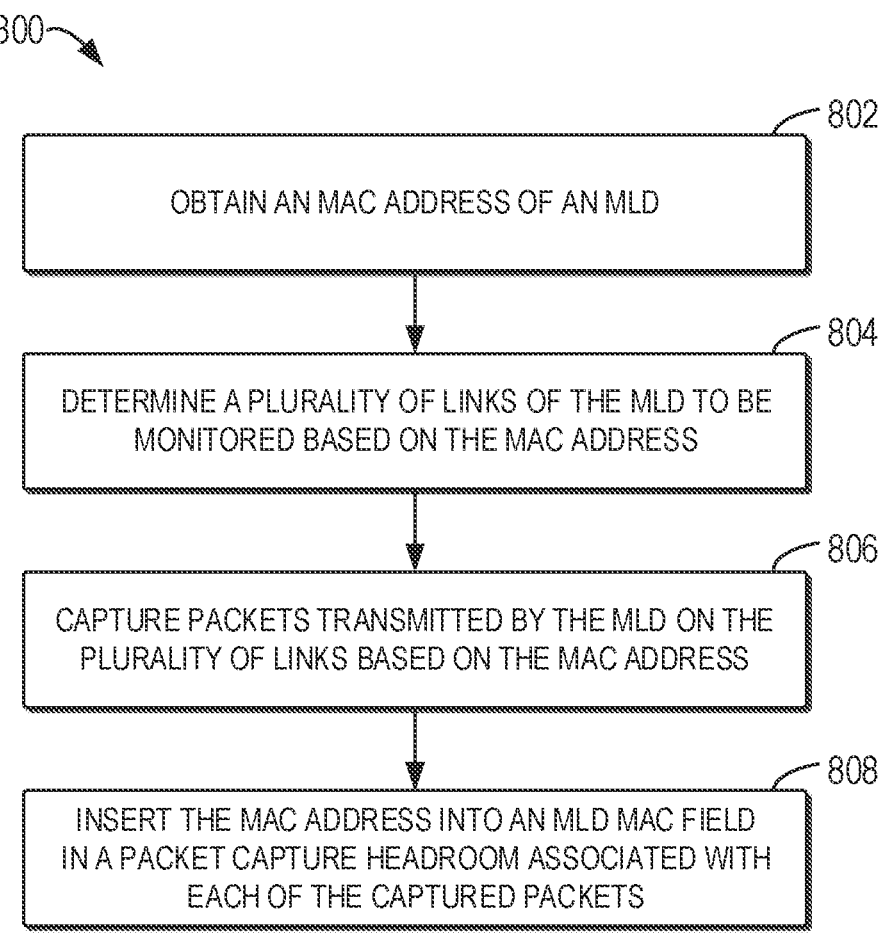
FIG. 8 illustrates a flowchart of an example method of MLD-level PCAP implemented by an AP, in accordance with some example implementations of the present disclosure.

FIG. 8 illustrates a flowchart of an example method 800 of MLD-level PCAP implemented by an AP, in accordance with some example implementations of the present disclosure. For example, the method 800 may be implemented by the AP 130-1 of FIG. 1, the AP 201-1 of FIG. 2, the AP 401-1 of FIG. 4, as well as other APs throughout the figures. While only some blocks are illustrated in the method 800, the method 800 may comprise other blocks described herein.

At 802, a monitor AP obtains a MAC address of an MLD to be monitored. For example, the AP 130-1 of FIG. 1 may receive an indication from the network device 140. For example, this indication is used for instructing AP 130-1 to capture packets transmitted by AP MLD 110. The AP 130-1 may obtain the MAC address 145 of the MLD from the indication, which is the MAC address of the AP MLD 110 in this example.

At 804, the monitor AP determines a plurality of links of the MLD to be monitored based on the MAC address of the MLD. For example, upon receiving the indication to capture packets of an MLD with the MAC address 145, the AP 130-1 may determine the plurality of links from the indication.

The AP 130-1 may scan frequency bands for working channels of the AP MLD 130-1, as well as other MLDs around. Such scans may be performed regularly or in response to the instruction by the network device 140. According to the scan, the AP 130-1 may send information related to the working channels to the network device 140. Such information from one or more APs can help the network device 140 to determine all working channels of a particular MLD, for example, AP MLD 110.

For an MLD PACP command taking AP MLD 110 as the MLD to be monitored, a plurality of links may be identified based on at least the MAC address of the AP MLD 110 and the information of working channels. In some example implementations, the links can be identified based on the MAC address, the information, and a predetermined set of radio bands. The set of radio bands may be specified by a user in the MLD PACP command. For example, the links to be monitored can be identified as described in connection with 212 of FIG. 2. The information about the links can be included in the indication for MLD PCAP and sent to the AP 130-1. As a result, the AP 130-1 may receive the indication to capture packets transmitted by the MLD on the plurality of links.

At 806, the monitor AP captures packets transmitted by the MLD on the plurality of links based on the MAC address. For example, the monitor AP 130-1 may capture the packets transmitted by the AP MLD 110 on the plurality of links as determined at 804. For example, the packets can be captured by a monitor AP as described in connection with 218 of FIG. 2 and 412 of FIG. 4.

At 808, the monitor AP inserts the MAC address into an MLD MAC field in a packet capture headroom associated with each of the captured packets. For example, suppose that the monitor AP 130-1 has captured a packet and has determined that this packet is transmitted by the AP MLD 110. Then, the monitor AP 130-1 may insert an MLD MAC field to the PACP headroom associated with this packet. This field indicates the MAC address of the AP MLD 110.

In some example implementations, for a captured packet, the monitor AP may determine a TSF timestamp relative to a uniform timeline associated with the MLD. The monitor AP may insert the TSF timestamp in the PACP headroom associated with this packet. On this basis, the monitor AP may sort the captured packets by the monitor AP based on MLD MAC fields, TIDs, sequence numbers, and TSF timestamps of the captured packets. Further, the monitor AP may send the sorted captured packets to a destination device, e.g., for analysis and presentation. For example, the monitor AP 130-1 may sort the captured packets of the AP MLD 110 and may send the sorted packets to a terminal device as the destination. The terminal device may be the device that sent the command for capturing packets of the AP MLD 110 at the beginning.

In some cases, the monitor AP 130-1 may receive further captured packets transmitted by the MLD on at least one of the plurality of links from one or more further monitor APs. In this case, the monitor AP may sort the captured packets and the further captured packets together based on MLD MAC fields, TIDs, sequence numbers, and TSF timestamps of the captured packets and the further captured packets.

In some cases, the monitor AP and the MLD are determined to be the same device, e.g., as the example of FIG. 3A shows. In such cases, the monitor AP has the ability to modify the captured packets. Consequently, the monitor AP may convert a MAC address of a captured packet of the monitored MLD (i.e., the MAC address corresponding to a link of the monitored MLD) with the MAC address of the MLD. The monitor AP may further convert frames corresponding to these captured packets from the IEEE 802.11 format to the IEEE 802.3 format.

Figure 9:
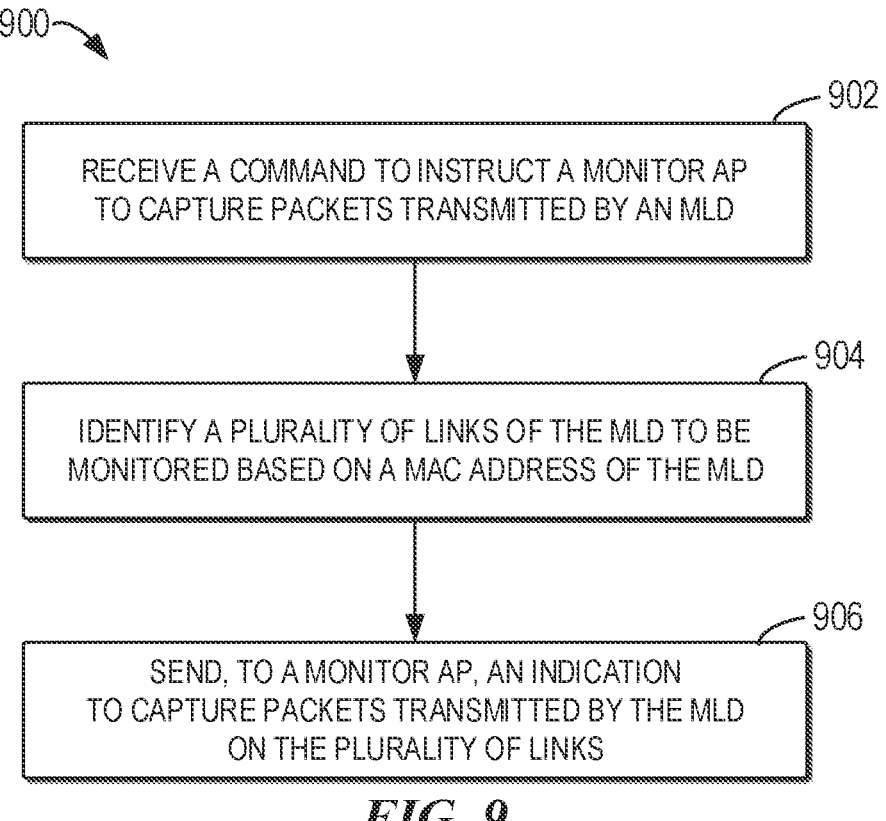
FIG. 9 illustrates a flowchart of an example method of MLD-level PCAP implemented by a network device, in accordance with some example implementations of the present disclosure.

FIG. 9 illustrates a flowchart of an example method 900 of MLD-level PCAP implemented by a network device, in accordance with some example implementations of the present disclosure. For example, the method 900 may be implemented by the network device 140 of FIG. 1, the AP controller 203 of FIG. 2, or the AP controller 403 of FIG. 4. While only some blocks are illustrated in the method 900, the method 200 may comprise other blocks described herein.

At 902, a network device receives a command to instruct a monitor AP to capture packets transmitted by an MLD. For example, the network device 140 may receive a command for capturing packets transmitted by the AP MLD 110 (e.g., identified by the MAC address 145). The monitor AP specified by this command is the AP 130-1.

At 904, the network device identifies a plurality of links of an MLD to be monitored based on the MAC address of the MLD. For example, based on the MAC address of the AP MLD 110, the network device 140 may retrieve the corresponding information for the working channels of the AP MLD 110, as well as identify the links to be monitored based on the information.

The network device may receive information related to the working channels of an MLD from one or more APs. For example, the network device 140 may receive scanned information related to working channels of MLDs from the APs under its management, such as from AP 130-1, AP 130-2, . . . , and AP 130-n. The network device 140 may schedule the APs to perform scans regularly or instruct the APs to perform scans as needed. For example, the network device 140 may aggregate the received information and store the information for respective MLDs (e.g., the AP MLD 110), in a way as described in connection with 202-206 of FIG. 2.

In some example implementations, the network device may identify the links based on the MAC address, the information, and a predetermined set of radio bands. The set of radio bands may be specified in the received command, for example.

When the links are identified, the network device may compare the characteristics of the plurality of links with the capabilities of the monitor AP. When the AP 130-1 is operating in an AP mode, the network device 140 may compare the characteristics of the plurality of links with the working channels of the AP 130-1. When the monitor AP 130-1 is operating in an AM mode, the network device 140 may compare the characteristics of the plurality of links with working channels and available radio resources of the AP 130-1.

Based on the comparison, the network device may determine if the monitor AP may perform the MLD PCAP task alone, with or without some possible adjustment of its working channels. In some cases, the monitor AP may not have the capability to perform the PACP task alone. Based on such a comparison result, the network device may determine one or more other monitor APs, to assist the monitor AP in accomplishing the PCAP task. In this case, the network device may determine the further monitor AP(s) based on the proximity to the monitored MLD from one or more further monitor APs and the capabilities of the further monitor AP(s). For example, the comparison and the determination of further AP(s) may be performed in a way as described in connection with 212 of FIG. 2 and 406 of FIG. 4.

At 906, the network device sends to a monitor AP an indication to capture packets transmitted by the MLD on the plurality of links. For example, the network device 140 may send an indication to the AP 130-1. The indication is to instruct the AP 130-1 to capture packets transmitted by the AP MLD 110 on the plurality of links as identified at 904. In the case that further monitor AP(s) are determined, the network device may also send to the further monitor AP(s) respective indication(s) to capture packets transmitted by the MLD on at least one of the plurality of links.

When it is determined that the monitor AP needs to be tuned at 904, the network device may also send the monitor AP an indication for tuning the working channels of the monitor AP. The indication is used to instruct the monitor AP to tune its working channels to the frequency channels corresponding to at least some of the plurality of links, as determined by the network device at 904. Similarly, the network device may send an indication to a further monitor AP to tune its working channels for the PCAP task.

In some example implementations, the network device may receive captured packets of the monitored MLD from the monitor AP, as well as from further monitor AP(s), if any. The packet capture headroom associated with each of the captured packets includes the MAC address of the monitored MLD and a TSF timestamp relative to a uniform timeline associated with the MLD. The network device may sort the captured packets, based on their MLD MAC fields, TIDs, sequence numbers, and TSF timestamps. The sorted captured packets may be sent by the network device to a destination device for further analysis and presentation. For example, the sorting of captured packets can be performed in a way as performed by the AP 201-1 at 222 of FIG. 2.

Figure 10:
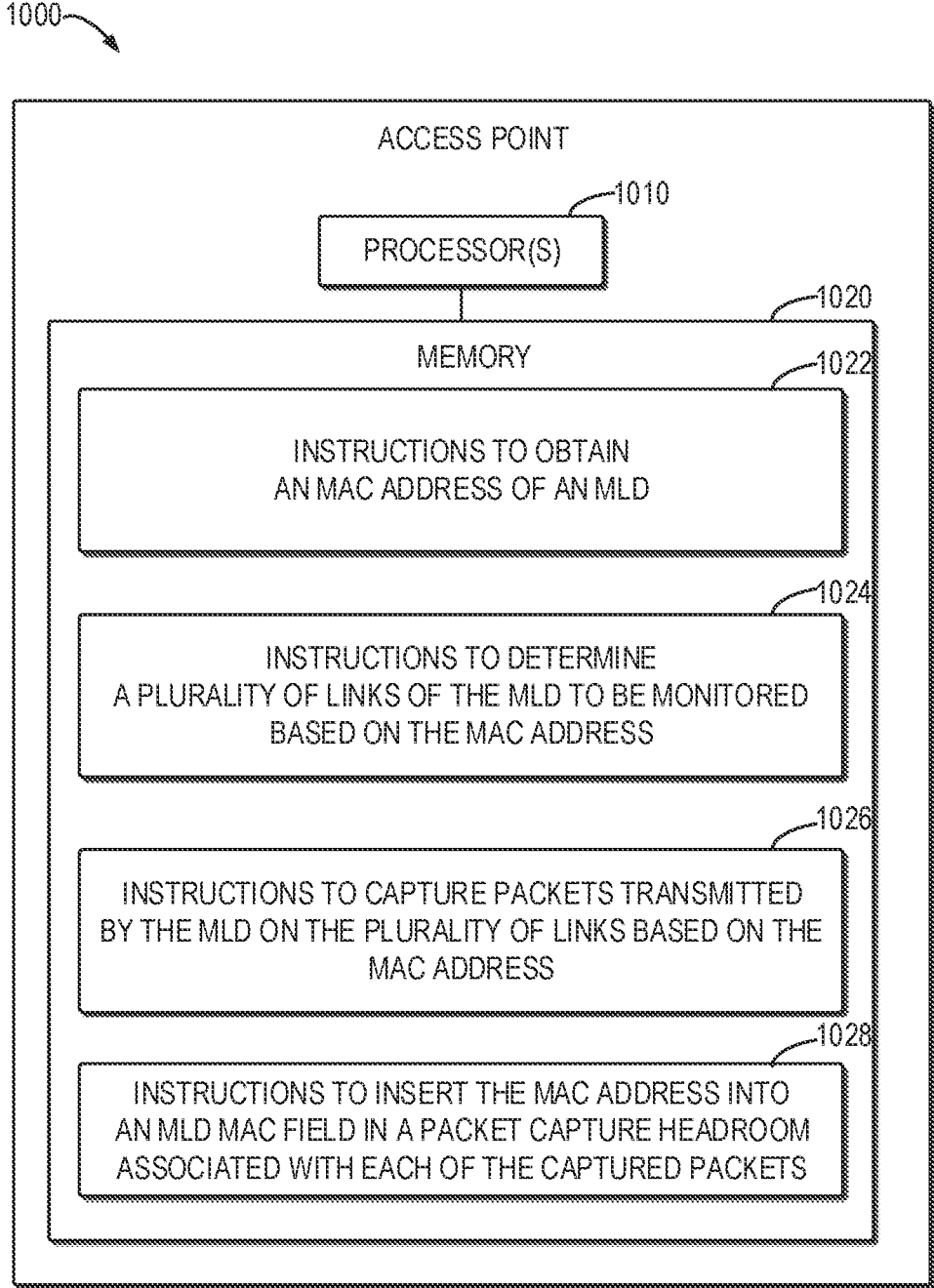
FIG. 10 illustrates a block diagram of an example AP in accordance with some example implementations of the present disclosure.

FIG. 10 illustrates a block diagram of an example AP in accordance with some example implementations of the present disclosure. The AP 1000 comprises at least one processor 1010 and a memory 1020 coupled to at least one processor 1010. The memory 1020 stores instructions to cause at least one processor 1010 to implement actions.

As illustrated in FIG. 10, the memory 1020 stores instructions 1022 to obtain a MAC address of an MLD. The memory 1020 further stores instructions 1024 to determine a plurality of links of the MLD to be monitored based on the MAC address of the MLD. The memory 1020 further stores instructions 1026 to capture packets transmitted by the MLD on the plurality of links. The memory 1020 further stores instructions 1028 to insert the MAC address of the MLD into an MLD MAC field in a packet capture headroom associated with each of the captured packets.

In these implementations, when executed by the AP 1000, the instructions may cause the AP 1000 to capture packets for a particular MLD on multiple radio links. The captured packets are associated the MAC address of the MLD, and may be further sent to a destination device for analysis and presentation.

Figure 11:
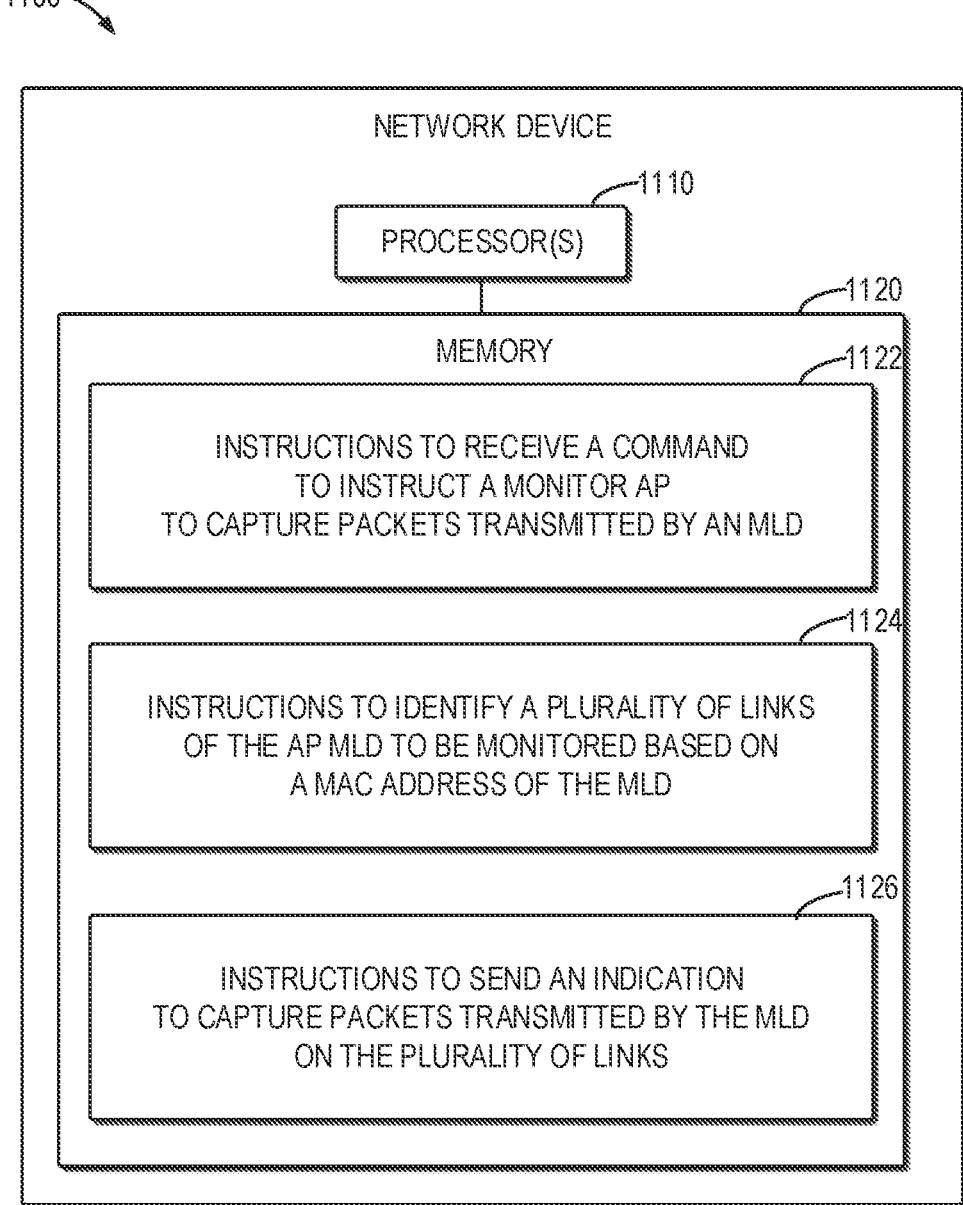
FIG. 11 illustrates a block diagram of an example network device in accordance with some example implementations of the present disclosure.

FIG. 11 illustrates a block diagram of an example network device 1100 in accordance with some examples of the present disclosure. The network device 1100 comprises at least one processor 1110 and a memory 1120 coupled to at least one processor 1110. The memory 1120 stores instructions to cause at least one processor 1110 to implement actions.

As illustrated in FIG. 11, the memory 1120 stores instructions 1122 to receive a command to instruct a monitor AP to capture packets transmitted by an MLD. The memory 820 further stores instructions 1124 to identify a plurality of links of the MLD to be monitored based on a MAC address of the MLD. The memory 1120 further stores instructions 1126 to send an indication to capture packets transmitted by the MLD on the plurality of links. In the implementations, after receiving a user command for MLD-level PCAP, the network device may execute the instructions to identify the links to be monitored and to send the indication to the monitor AP.

Implementations of the present disclosure also provide at least one computer program product tangibly stored on a non-transitory computer-readable storage medium. The computer program product includes program codes or instructions which can be executed to carry out the method as described with reference to FIGS. 2-9.

While some of the operations in the foregoing implementations were implemented in hardware or software, in general, the operations in the preceding implementations can be implemented in a wide variety of configurations and architectures. Therefore, some or all of the operations in the foregoing implementations may be performed in hardware, software, or both.

It should be noted that specific terms disclosed in the present disclosure are proposed for convenience of description, and a better understanding of example implementations of the present disclosure, and the use of these specific terms may be changed to another format within the technical scope or spirit of the present disclosure.

Program codes or instructions for carrying out methods of the present disclosure may be written in any combination of one or more programming languages. These program codes or instructions may be provided to a processor or controller of a general-purpose computer, special-purpose computer, or other programmable data processing apparatus, such that the program codes, when executed by the processor or controller, cause the functions/operations specified in the flowcharts and/or block diagrams to be implemented. The program code or instructions may execute entirely on a machine, partly on the machine, as a stand-alone software package, partly on the machine and partly on a remote machine, or entirely on the remote machine or server.

In the context of this disclosure, a computer-readable medium may be any tangible medium that may contain or store a program for use by or in connection with an instruction execution system, apparatus, or device. The computer-readable medium may be a computer-readable signal medium or a computer-readable storage medium. A computer-readable medium may include but is not limited to an electronic, magnetic, optical, electromagnetic, infrared, or semiconductor system, apparatus, or device, or any suitable combination of the foregoing. More specific examples of the computer-readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order illustrated or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable sub-combination.

In the foregoing Detailed Description of the present disclosure, reference is made to the accompanying drawings that form a part hereof, and in which is illustrated by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A method comprising:
   obtaining, by a monitor access point (AP), a media access control (MAC) address of a multi-link device (MLD);
   determining, by the monitor AP and based on the MAC address, a plurality of links of the MLD to be monitored;
   capturing, by the monitor AP and based on the MAC address, packets transmitted by the MLD on the plurality of links; and
   inserting, by the monitor AP, the MAC address into an MLD MAC field in a packet capture headroom associated with each of the captured packets.

2. The method of claim 1, wherein determining the plurality of links comprises:
   scanning, by the monitor AP and based on the MAC address, frequency bands for working channels of the MLD; and
   sending, by the monitor AP and to a network device, information related to the working channels of the MLD.

3. The method of claim 2, wherein determining the plurality of links further comprises:
   receiving, by the monitor AP and from the network device, an indication to capture packets transmitted by the MLD on the plurality of links, the plurality of links being identified by the network device based on the MAC address and the information.

4. The method of claim 1, further comprising:
   determining, by the monitor AP and for a respective packet of the captured packets, a timestamp synchronization function (TSF) timestamp relative to a uniform timeline associated with the MLD; and inserting, by the monitor AP, the TSF timestamp, in a respective packet capture headroom associated with the respective packet.

5. The method of claim 4, further comprising:
   sorting the captured packets by the monitor AP based on MLD MAC fields, traffic identifiers (IDs), sequence numbers, and TSF timestamps of the captured packets; and
   sending, by the monitor AP to a destination device, the sorted captured packets.

6. The method of claim 5, further comprising:
   receiving, by the monitor AP and from one or more further monitor APs, further captured packets transmitted by the MLD on at least one of the plurality of links.

7. The method of claim 6, wherein sorting the captured packets comprises:
   sorting the captured packets and the further captured packets, based on MLD MAC fields, traffic IDs, sequence numbers, and TSF timestamps of the captured packets and the further captured packets.

8. The method of claim 7, wherein the monitor AP and the MLD are the same device, and the method further comprises:
   converting, by the monitor AP, a first MAC address of a respective packet of the captured packets of the MLD to the MAC address of the MLD, wherein the first MAC address corresponds to a link of the MLD on which the respective packet is transmitted.

9. The method of claim 8, further comprising:
   converting, by the monitor AP, frames corresponding to the captured packets of the MLD from an IEEE 802.11 format to an IEEE 802.3 format.

10. An access point (AP) comprising:
   at least one processor; and
   a memory coupled to the at least one processor, the memory storing instructions to cause the at least one processor to:
      obtain a media access control (MAC) address of a multi-link device (MLD);
      determine, based on the MAC address, a plurality of links of the MLD to be monitored;
      capture, based on the MAC address, packets transmitted by the MLD on the plurality of links; and
      insert the MAC address into an MLD MAC field in a packet capture headroom associated with each of the captured packets.

11. The AP of claim 10, wherein the instructions further cause the at least one processor to:
   determine, for a respective packet of the captured packets, a timestamp synchronization function (TSF) timestamp relative to a uniform timeline associated with the MLD; and
   insert the TSF timestamp in a respective packet capture headroom associated with the respective packet.

* * * * *